(12) United States Patent
Brandwitte et al.

(10) Patent No.: US 6,845,685 B2
(45) Date of Patent: Jan. 25, 2005

(54) CONTROL MECHANISM

(75) Inventors: Werner Brandwitte, Langerwehe (DE); Tim Bartling, Aachen (DE); Georg Quatier, Aachen (DE)

(73) Assignee: GIF Gesellschaft für Industrieforschung mbH, Alsdorf (DE)

(*) Notice: Subject to any disclaimer, the term of this patent is extended or adjusted under 35 U.S.C. 154(b) by 28 days.

(21) Appl. No.: 10/157,771

(22) Filed: May 29, 2002

(65) Prior Publication Data

US 2003/0019710 A1 Jan. 30, 2003

(30) Foreign Application Priority Data

Jun. 1, 2001 (DE) .......................................... 101 26 971
Jun. 12, 2001 (DE) .......................................... 101 28 318

(51) Int. Cl.[7] .............................................. F16H 63/20
(52) U.S. Cl. ............................... 74/473.25; 74/473.26; 74/473.36
(58) Field of Search .......................... 74/473.1, 473.24, 74/473.25, 473.36

(56) References Cited

U.S. PATENT DOCUMENTS

| | | | | |
|---|---|---|---|---|
| 3,513,717 A | * | 5/1970 | Lickey | .................... 74/473.26 |
| 4,503,727 A | * | 3/1985 | Ballendux | ................ 74/473.24 |
| 4,621,537 A | * | 11/1986 | Piazza et al. | ............. 74/473.24 |
| 5,737,969 A | * | 4/1998 | Brown et al. | ............. 74/473.25 |
| 6,026,702 A | * | 2/2000 | Dreier et al. | ............. 74/473.21 |
| 6,357,316 B1 | * | 3/2002 | Bieber | ...................... 74/473.24 |

FOREIGN PATENT DOCUMENTS

| | | |
|---|---|---|
| DE | 11 25 730 B | 3/1962 |
| DE | 199 01 056 A1 | 8/1999 |
| DE | 199 10 055 A1 | 8/1999 |
| DE | 100 29 620 A1 | 12/2000 |

* cited by examiner

Primary Examiner—William C. Joyce
(74) Attorney, Agent, or Firm—Henry M. Feiereisen; Ursula B. Day

(57) ABSTRACT

In a control mechanism with a switchable transmission path comprised of mechanism links mounted on a frame, and with a switching pinion gear, through which at least two mechanism links can be optionally incorporated in the transmission path for switching purposes, wherein the two mechanism links are moveably held on a mount of the frame via switching elements, and wherein the switching pinion gear acts through a switching path to select and/or engage or disengage one of the two mechanism links on the switching elements, the mount can encompass a bearing element that is arranged so that it can move relative to the frame, and comprises part of the switching path, and an insertion lockout can be securely fastened to the frame, and the switching elements can be secured to the mount by means of an axially divided bearing block.

36 Claims, 19 Drawing Sheets

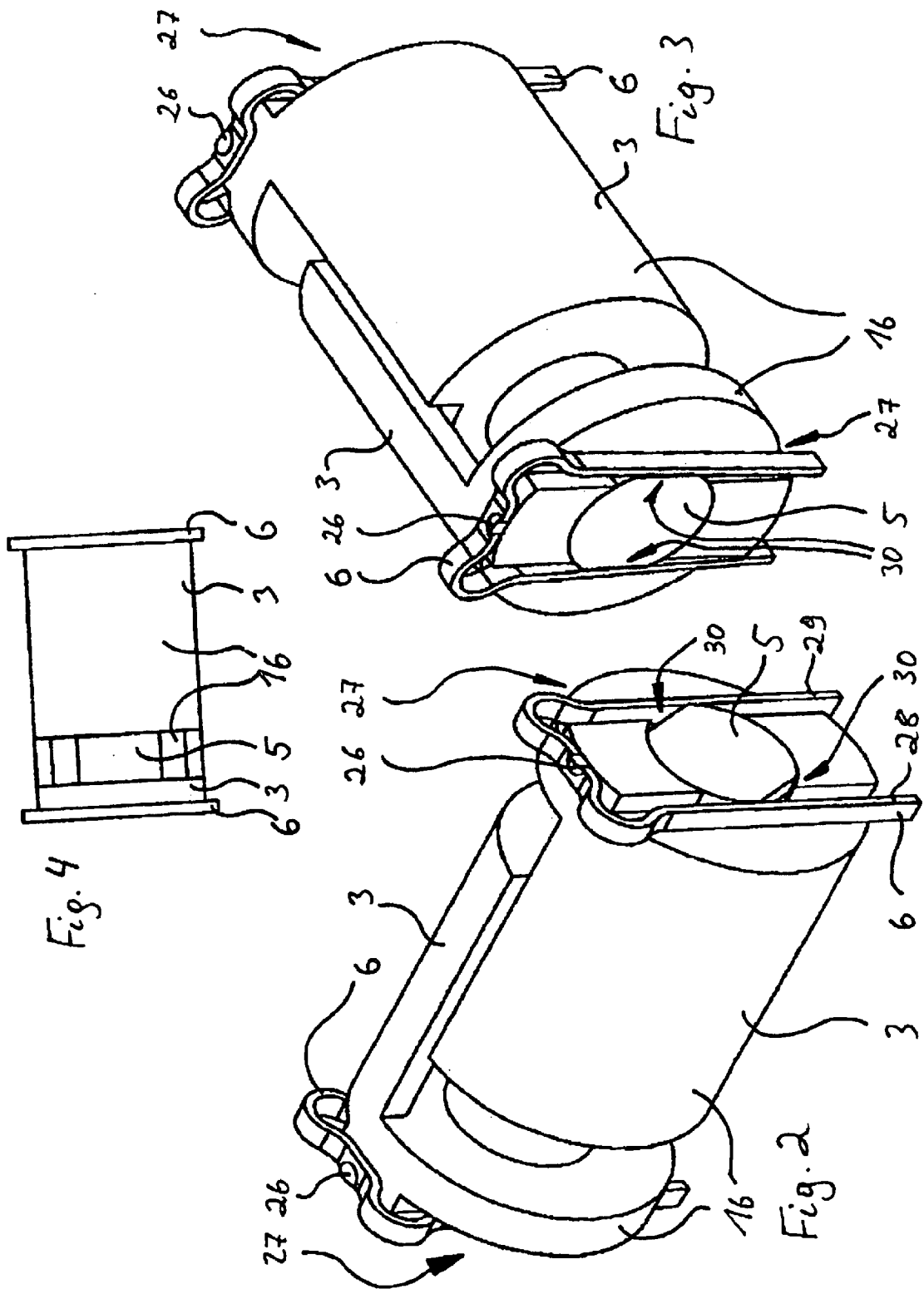

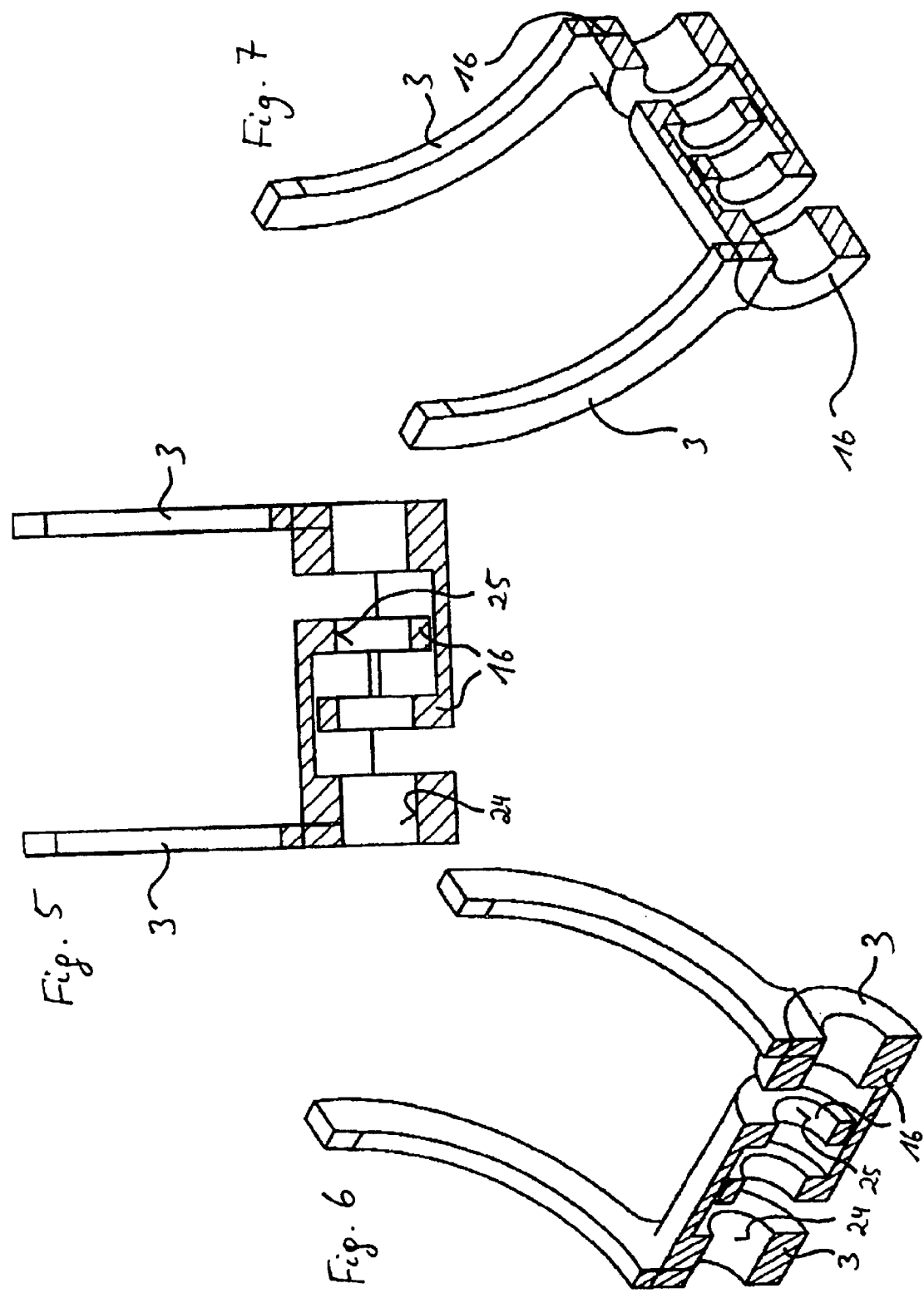

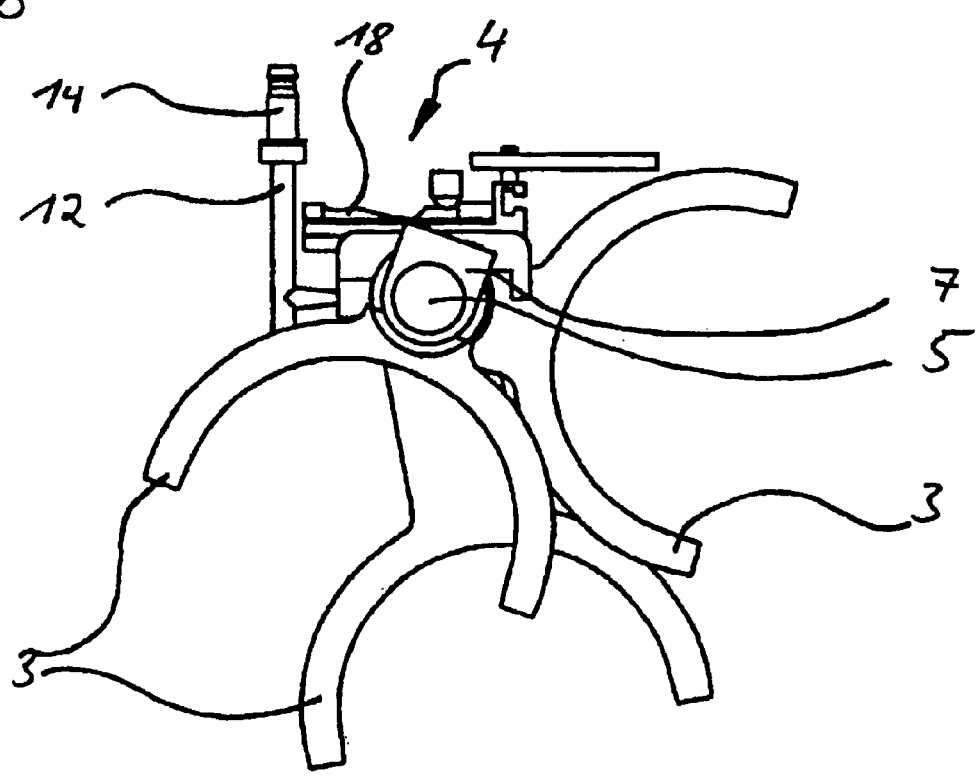

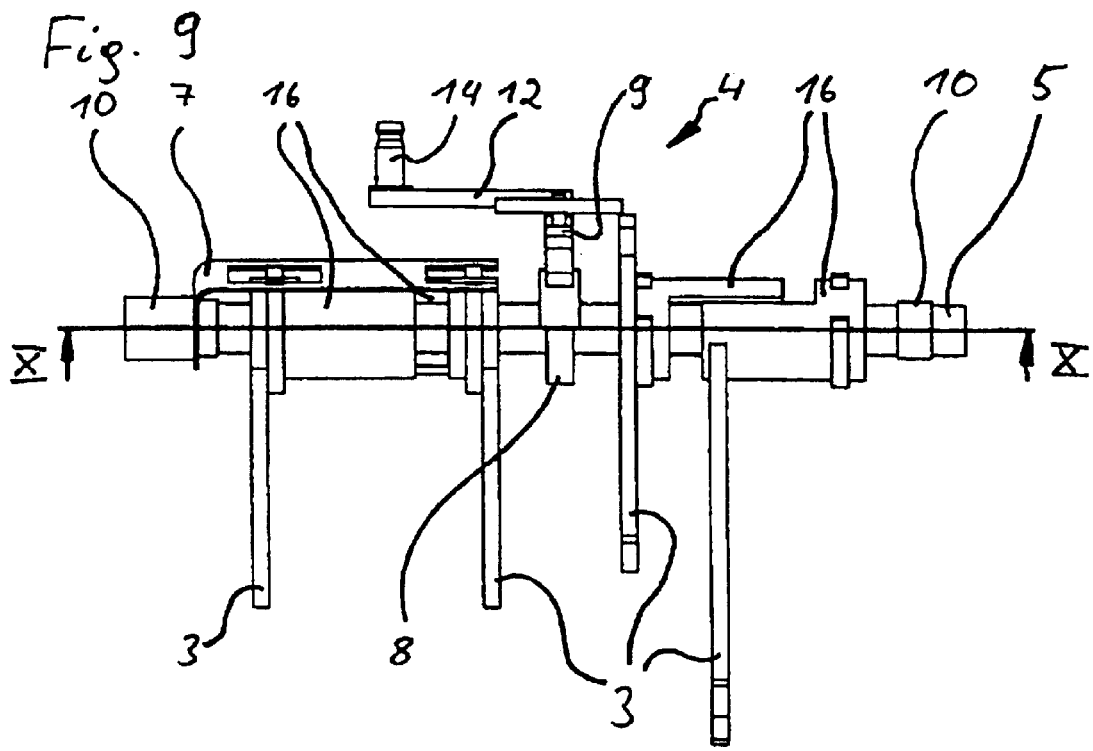
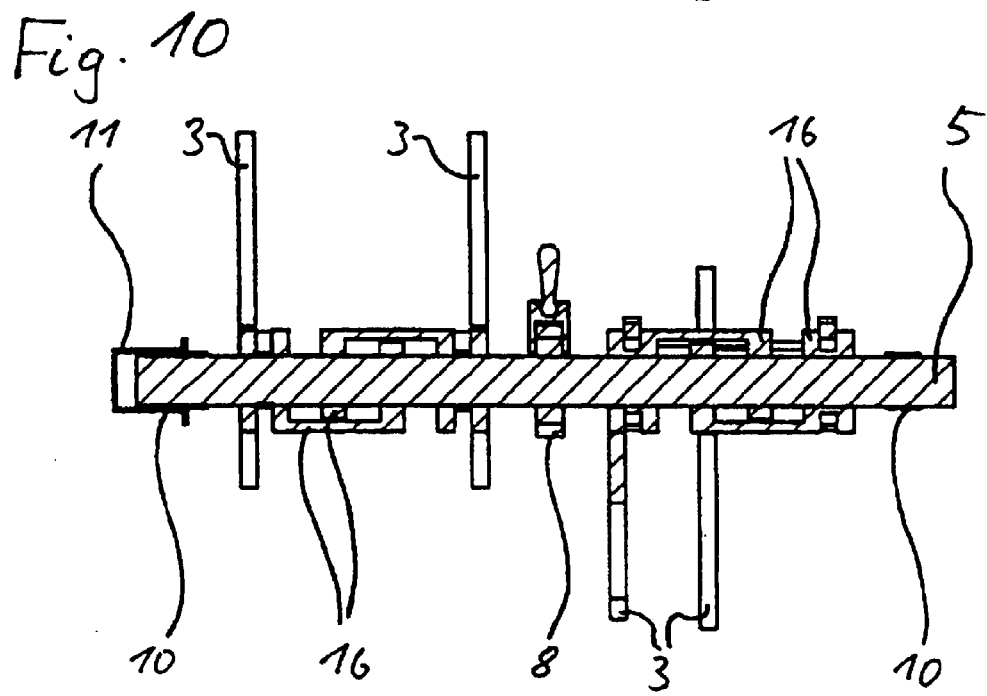

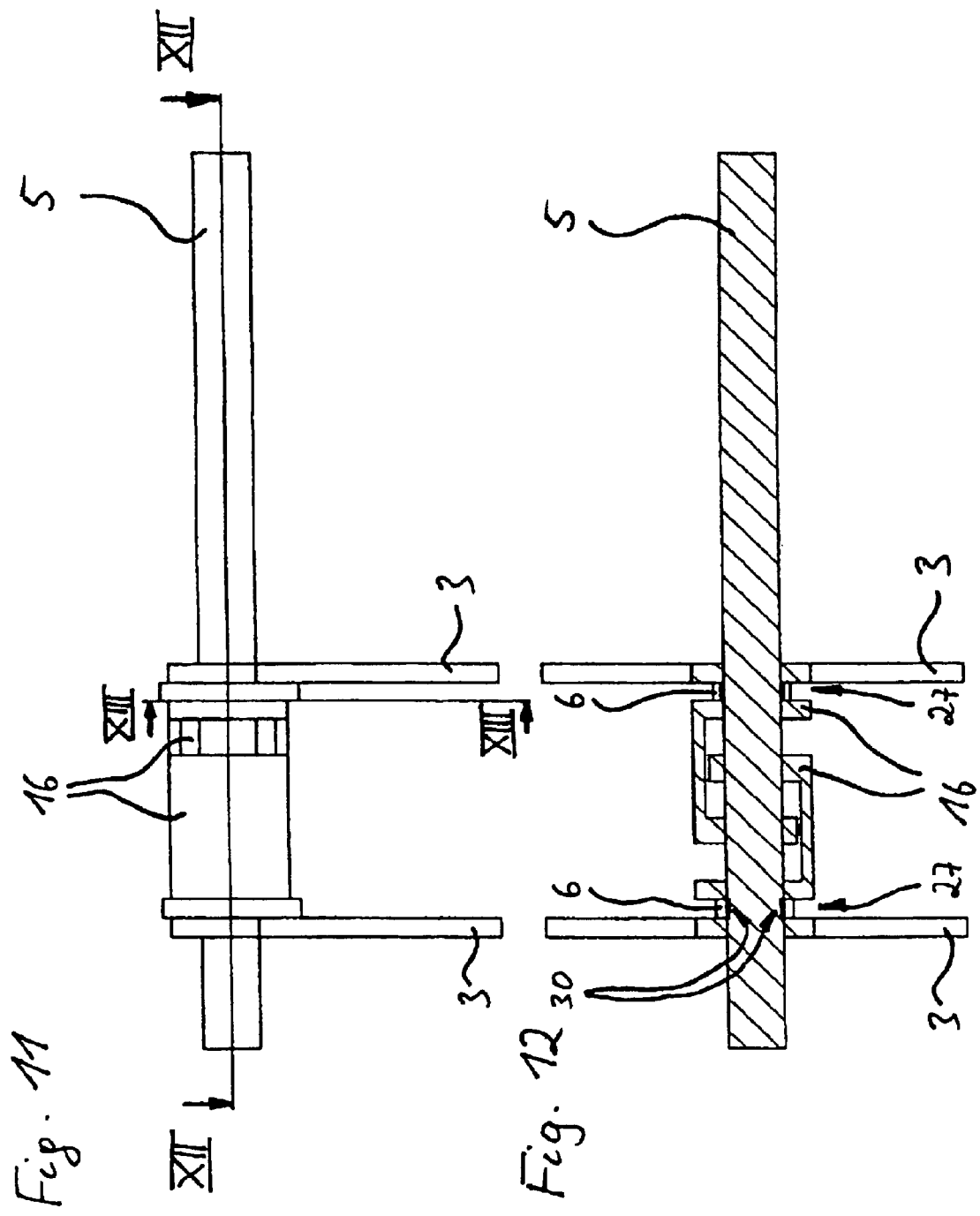

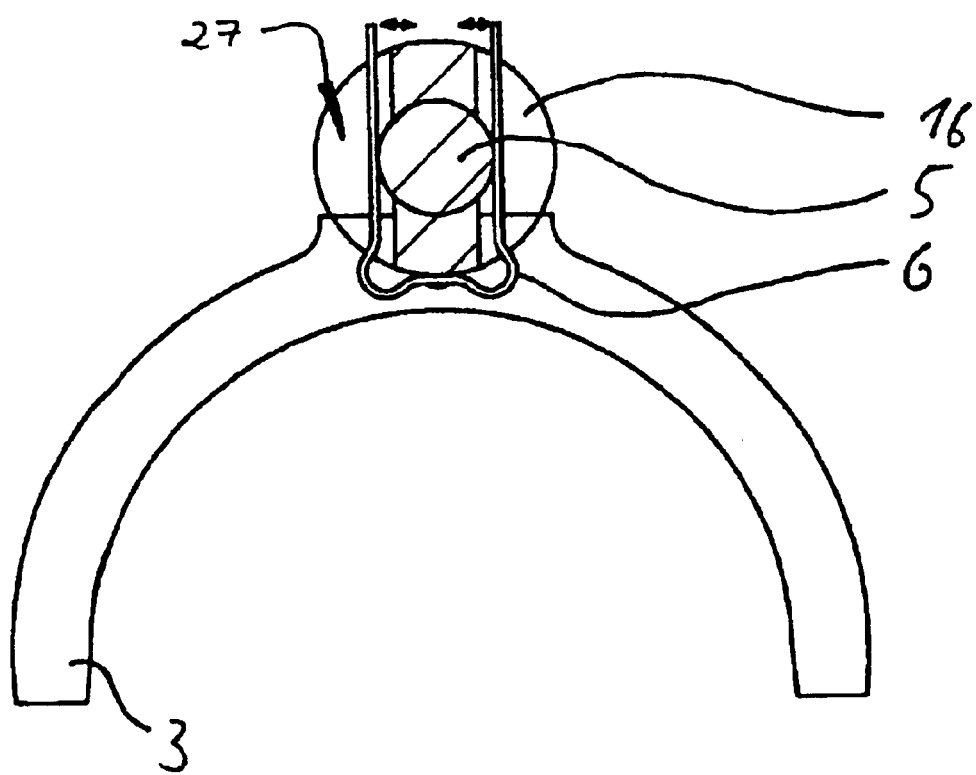

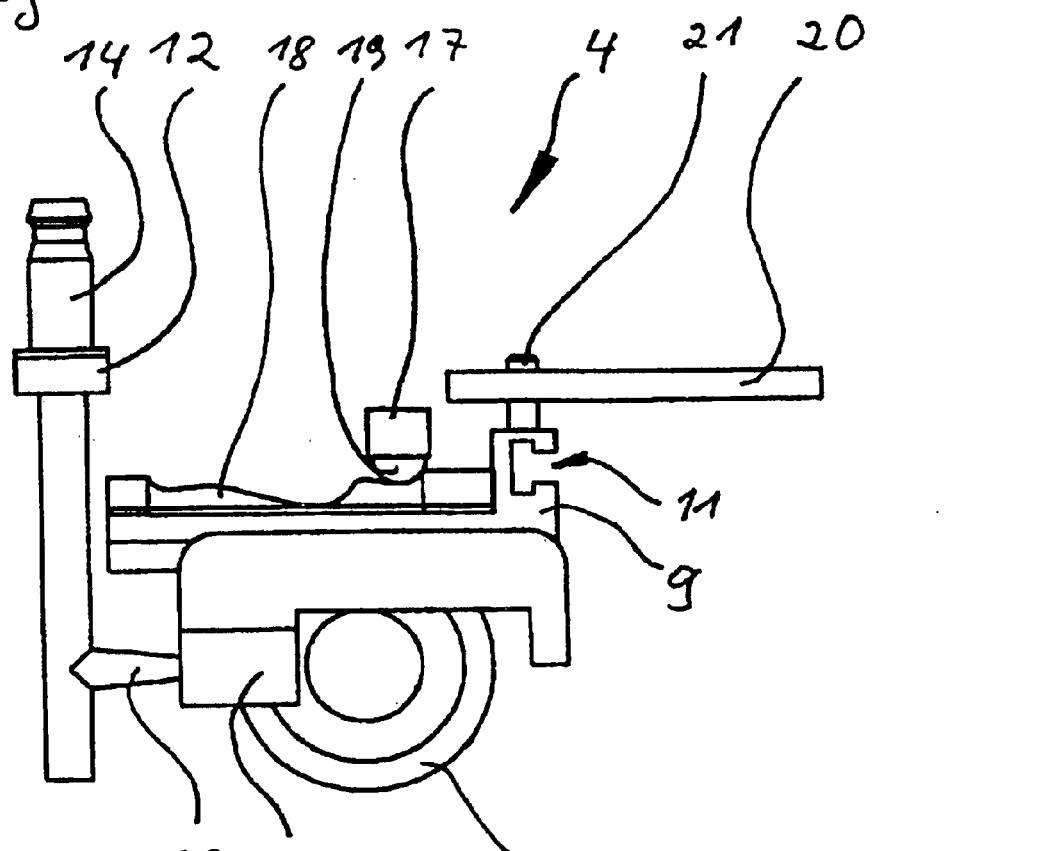
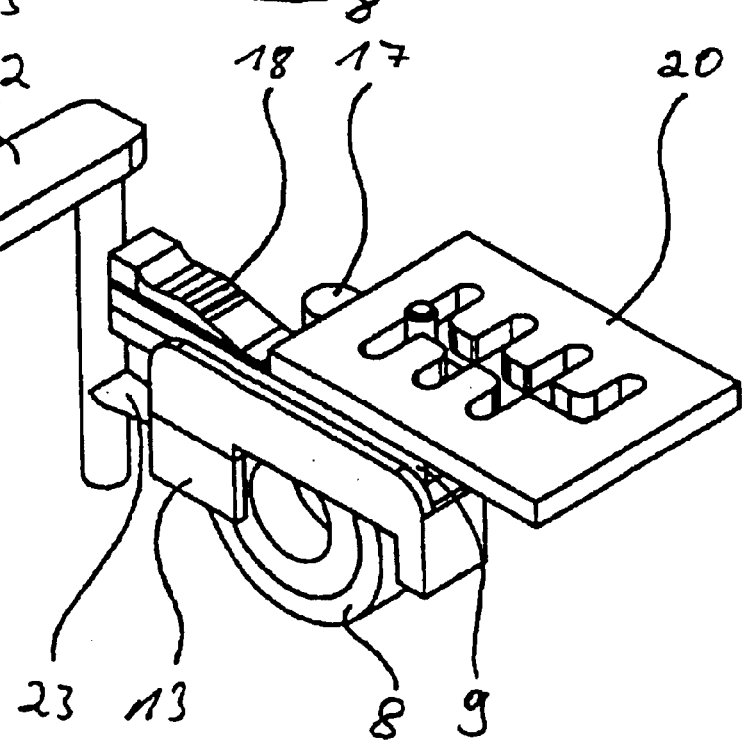

CONTROL MECHANISM

BACKGROUND OF THE INVENTION

The invention relates to a control mechanism with a switchable transmission path comprised of mechanism links mounted on a frame, and with a switching pinion gear, through which at least two mechanism links can be optionally incorporated in the transmission path for switching purposes. In this case, the two mechanism links are moveably held on a mount of the frame via switching elements, and the switching pinion gear acts through a switching path to select and/or engage or disengage one of the two mechanism links on the switching elements.

Such control mechanisms are sufficiently known as conventional control mechanisms, wherein the mechanism links in such known control mechanisms are normally toothed gears used to realize suitable transmission ratios. These control mechanisms have at least two toothed gears, which can optionally be switched in the respective driving path or transmission path, i.e., in the or of the power or active chain of the gearing. In order to be able to reliably execute such a switching process, the switchable toothed gears are respectively mounted on selector forks, which are moveably mounted on an axle fixed relative to the frame, and held by this axis.

The selector forks also have recesses or similar devices into which a switch spring can engage, which are actively linked with a switching pinion gear, e.g., a gear lever, by means of a switching path, such as suitable passes or the like. If the gear lever is actuated, the switch spring is correspondingly activated via the switching path, fixes a corresponding selector fork, which then engages the selected gear. To ensure a sufficient operational reliability, the switch spring also encompasses an associated insertion lockout, which prevents gears that were not selected from being engaged.

SUMMARY OF THE INVENTION

The object of this invention is to provide a control mechanism that takes up less space.

As a solution, the invention proposes a generic control mechanism in which the mount for the switching elements encompasses a bearing element that can be moved relative to the frame, and comprises part of the switching path.

In this respect, the invention proceeds from the basic inventive idea of doing without a separate mount for the switching elements, and using the elements of the switching path to be provided anyway, e.g., the springs or a new assembly similar in its effect, as the mount. As a result of this omission, the control mechanism according to the invention saves on space. Instead of doing without, however, this basic idea can be implemented by selecting less expensive or stable, and hence smaller, remaining bearing elements owing to the bearing element according to the invention, which is a part of the switching path. This makes it possible to accommodate a switching mandrel in which elements of the switching path are usually arranged at more points than possible in conventional control mechanisms, since the switching mandrel is substantially smaller in a control mechanism according to the invention. In this way, for example, the switching mandrel can be provided on a side of the gearing facing away from a driver or passengers, even given tighter and unfavorable conditions in terms of space, thereby increasing safety.

In this conjunction, a "switching path" encompasses all actively driving components for gear and lane selection.

In a preferred embodiment, the respective switching element is secured to the mounting element in such a way that a switching element to be switched and the bearing element can be moved together once a switching process is initiated with this switching element. In such an arrangement, only the bearing element must be able to be shifted under a load relative to the frame. In this regard, only the mount for the bearing element on the frame need be shaped accordingly, while only substantially less stringent requirements need to be satisfied when securing the switching element to the bearing element, since the switching elements are only shifted relative to the bearing element under no load. In this regard, the arrangement can take up commensurately less space, since smaller bearings can be used. It is understood that such a configuration is advantageous even independently of the remaining features of this invention.

In a preferred embodiment, the control mechanism can encompass at least a connecting element between the bearing element and one of the switching elements. In this case, the connecting element preferably has at least two positions, a first switching position in which it fixes the switching element relative to the bearing element, and releases it relative to the frame, and a second locked position, in which it releases the switching element relative to the bearing element and fixes it relative to the frame, and can be shifted in these two positions. In this way, the switching element can be moved together with the bearing element in a particularly easy and space-saving manner, when this switching element is switched. The spatial proximity between the bearing element and connecting element also makes it possible to operate the connecting element directly via the bearing element. In this way, the connecting element or connecting elements perform three tasks. Firstly, the selection of a specific switching element makes it possible to choose a specific lane. Secondly, the other switching elements can be designated by selecting the locked position for these unselected switching elements. Thirdly, fixing the switching element and bearing element makes it possible to move the switching element and bearing element, which is a part of the switching path, together, so that the gear can be engaged and disengaged.

It is understood that, instead of the bearing element according to the invention, a connecting element that can alternate between a switching position and locked position as described above can also interact with a conventional component of the switching path accordingly, and yield the structural advantages described above.

Accordingly, the connecting element is preferably able to shift between the switching position and locked position as a constituent of the switching path, preferably due via the bearing element. It is understood that the connecting element being a constituent of the switching path is advantageous, even independent of these two positions and the ability to shift the connecting element.

The connecting element is especially simple, and hence inexpensive, to fabricate by using a spring element for this purpose that can be shifted into the switching position or locked position via the bearing element. The resilient properties make it possible to configure the arrangement in such a way that the bearing element only needs to apply only one direction of force for the position shift, while the return shift is executed by the spring element itself.

In this conjunction, the term "fix" means that the connecting element secures the switching element in such a way relative to a third assembly that the degree of freedom of the switching element is correspondingly set for an engagement or disengagement. The switching element can be left with other degrees of freedom.

It is understood that the joint movement between the switching element and bearing element to be switched and/nor the presence of the connecting element is advantageous even independently of the other features of the control mechanism. On the one hand, this provides a structural simplification of the overall arrangement and a corresponding reduction in cost. On the other hand, this component reduction also increases the reliability of the overall arrangement.

Another solution proposed by the invention is a generic control mechanism in which an insertion lockout securely attached to the frame is provided. Such an arrangement also takes up significantly less space than known arrangements. The insertion lockout makes it possible to keep the remaining switching elements fixed relative to the frame, so that the switching elements not to be switched, which are hence also not under a load, are shifted relative to the bearing element (s).

In addition, the fixed insertion lockout increases the reliability of the overall arrangement, since no moving assembly is needed.

In a preferred embodiment, the insertion lockout is a binder affixed to the frame. Such an insertion lockout is very easy to assemble, and is hence easy to mount and cost-effective.

The insertion lockout preferably has formfitting elements fixed relative to the frame, with which complimentary formfitting elements interact, fixing the respective unselected switching element via a positive engagement relative to the frame. It is understood that this interlocking engagement only needs to fix the degree of freedom or those degrees of freedom that might prompt a switching element to unintentionally engage a gear. Such formfitting elements, which can be comprised of grooves, recesses or bumps, make it particularly easy and cost-effective to realize an insertion lockout securely fixed to the frame.

A moveably arranged bearing element comprising part of the switching path can be structurally realized in a particularly simple manner by using a control shaft as the bearing element. In prior art, the switching elements are mounted on an axis relative to the frame, while all movements of the switching elements are initialized by separate assemblies. When using a control shaft, forces are relayed via the shaft in a switching process. These can be switching forces, so that the control shaft is part of the switching path. Independently of the other features of the invention, it may be advantageous to reduce the number of components to have a force-transmitting shaft that possibly initializes other movements, and on which at least one switching element is mounted.

It is understood that the control shaft can be used to convey rotational forces as well as axial forces.

The control shaft is preferably mounted on the frame or a bearing bushing of the frame by means of a sliding bearing. Such a mount is relatively cost-effective to build, and also offers the advantage that both axial movements and rotating movements of the control shaft are possible without any problem.

The control shaft is preferably connected axially with the respective switching element to activate a switching element. In this way, the necessary switching forces can be easily imparted to the switching element. In addition, an axial shift of the switching element corresponds to the known switching element shifting on a bearing axis, so that a structural conversion of this invention is extremely easy to implement in this regard.

The overall arrangement is especially simple in structural design if this connection between the control shaft and switching element is established by means of an interlocking engagement. In particular, such an interlocking engagement can be opened or closed easily to select a switching element.

Such an axial shift can be used to preferably engage or disengage a correspondingly selected gear via a selected switching element.

In particular for lane selection as also provided in conventional control mechanisms, the control shaft can be connected with the switching pinion gear via a rotary actuator. This type of rotary actuator makes it easy to impart a synchronized movement to the switching elements mounted on the control shaft. Synchronization here takes place via the control shaft itself. Such a rotational movement makes it possible to select various switching elements in a manner according to the invention, for example. Such a selection would correspond to a lane selection given previously known control mechanisms.

The control shaft preferably encompasses a driving gear, in particular a toothed gear, which is driven by the switching pinion gear, in order to ensure a corresponding rotary actuation of the control shaft.

Accordingly, the switching path can encompass a gear rack, which is interactively connected with the toothed gear, wherein the gear rack is interactively connected with the switching pinion gear via a pass, which preferably engages a recess or the like in the gear rack. In such an arrangement, the rotary actuator connection according to the invention between the control shaft and switching pinion gear can be easily integrated into existing control mechanisms, since known control mechanisms also have such a switching pass.

On the other hand, the switching forces can also be advantageously transmitted via two toothed gears, e.g., which are interactively connected in an axially positive manner by a tongue and groove connection, or via a groove of a toothed gear in which the other toothed gear engages.

The use of a toothed gear or the prescribed two toothed gears in a switching path is advantageous even independently of the other features of this invention, since this makes it possible to convey switching forces without slippage, and hence in an operationally reliable way.

The ability to axially shift the control shaft can be utilized in particular to engage or disengage a mechanism link or a gear. In this case, in particular the ability to shift by two degrees of freedom—axially and rotationally relative to the shaft axis—advantageously reduces the component, since two different sequences of movement can be initialized with a single assembly.

In this regard, the basic inventive idea of bringing together the force paths for gear and lane selection in a switching path already before the selector forks or similar contact elements that guide the control mechanisms or toothed gears of the transmission and then separating them again if required is cumulatively or alternatively realized, in particular for purposes of component reduction.

One structurally simple conversion of an axial drive for the control shaft can be realized by having the switching path encompass a lever that engages the axial drive for the control shaft. The axial drive advantageously encompasses an axial mold clamp that extends into the axial drive for the control shaft. The axial drive preferably encompasses an axial formfit between the control shaft and lever, so that the necessary forces can be easily transmitted. Such an axial formfit can be realized, for example, by having a gear rack of the switching path into which the lever extends grip a toothed gear of the control shaft to form the axial formfit axially relative to the control shaft. In this way, the axial movement of the lever and a rotational movement can be conveyed to the control shaft by means of the toothed gear.

The lever is preferably drive-connected with the switching pinion gear by means of a projection, in particular by a corresponding switching pass, so that this lever can also be easily integrated in existing control mechanism arrangements. It is understood that using such a lever in the switching path in particular for engaging or disengaging a gear is advantageous even independently of the remaining features of this invention.

Otherwise, a motor drive can also be provided to furnish an automated transmission. This can act directly on the control shaft, for example, by having a first motor initialize an axial movement, and a second motor a rotational movement, of the control shaft. The switching forces can advantageously first be combined onto a contact element and then transmitted to the control shaft, however, in particular for space considerations. For example, this can be realized by a toothed gear described above. In particular, it is advantageous to secure the two motor drives to a separate frame. In particular the contact element on which the switching forces are brought together should preferably also be mounted on this frame. This arrangement makes it possible to pre-mount the motor drive separately, and secure it to the remaining transmission in a single operation. Otherwise, the attachment means used to secure the frame to the remaining transmission need only be able to compensate the switching forces, while the forces generated by the motor drives and other factors can be compensated by the frame. It is understood that such a realization of an automated transmission is advantageous even independently of the remaining features of this invention.

In the control mechanism, the switching path can be interactively connected with a device for varying reaction forces in the switching pinion gear. Such a variation device can be used in particular to operate a gear lever of the switching pinion gear with a specific force profile. This force profile can be designed in such a way, for example, that the gear lever preferably has an idle position in the lane of the third and fourth gear, as is the case for control mechanisms in prior art. In like manner, the forces can be correspondingly varied to reach the remaining lanes. This holds true in particular for engaging the reverse gear.

It is understood that such a variation device is advantageous apart from the remaining features of this invention, and can also be used advantageously in conjunction with switching pinion gears other than the known shift levers. In particular, such a variation device can also be used to compensate the forces applied by the switching elements, for example when using a motor drive.

A specific configuration of the variation device can encompass an energy-storing device activated as a function of a position of the switching pinion gear, for example. Such an energy-storing device can in particular have a resilient spring element and—even independently of the remaining features of this invention—be used advantageously to compensate forces prevailing in the remaining switching pinion gear or applied by the switching elements.

Such a variation device can be realized in a structurally simple manner by having it encompass a gate and a gate follower, wherein the gate follower follows according to a shift in the switching path of the gate, and can feed reaction forces into the switching pinion gear in the manner desired owing to the gate path. In particular, the gate can be provided on a gear rack of the switching path, and the gate follower in the frame of the control mechanism, so that the overall arrangement is relatively simple to set up. It is understood that these structural conditions can also be provided in reverse.

As another solution, the invention proposes a generic control mechanism in which switching elements arranged axially moveable relative to the mounting device are secured to the mounting device via an axially divided bearing block, e.g., a bearing bush.

In particular, the bearing blocks can be interleaved by at least two switching elements. This type of construction makes it possible to increase the bearing length, so that tilting can be effectively counteracted. In particular, the bearing blocks can have divided bearing surfaces, which are preferably interleaved. The switching elements are particularly easy to accommodate on the mounting device or on a bearing element if at least one switching element is secured on the mounting device or bearing element via a sliding bearing. In particular, such a sliding bearing is comparatively inexpensive. In addition, the bearings between the switching element and bearing element are only stressed in an unloaded state, as already mentioned, thereby minimizing a bearing load. Therefore, this arrangement also makes it possible to use comparatively inexpensive bearing materials. It is here understood that such sliding bearings are advantageous even independently of the remaining features of the invention, in particular since such sliding bearings can offset even smaller side tilts without any problems in the unloaded state. This holds true in particular in conjunction with axially divided bodies.

This arrangement is advantageous in particular when several switching elements are situated on a bearing element, so that the total costs for expensive bearings can be reduced, since an expensive bearing need only be provided for this bearing element, and not for all switching elements.

BRIEF DESCRIPTION OF THE DRAWING

Additional advantages, objectives and properties of this invention shall be explained based on the description of the attached drawing, in which a control mechanism according to the invention is shown as an example. The drawing shows:

FIG. 2 a perspective view cut relative to the control shaft of two interleaved bearing bushes of two switching elements of the control mechanism according to FIG. 1;

FIG. 3 another perspective of the arrangement shown on FIG. 2;

FIG. 4 a side view of the arrangement shown on FIGS. 2 and 3;

FIG. 5 a section through two switching elements of the control mechanism according to FIG. 1;

FIG. 6 a perspective view of the section according to FIG. 5;

FIG. 7 another perspective of the section according to FIG. 5;

FIG. 8 a front view of the control mechanism according to FIG. 1;

FIG. 9 a side view of the control mechanism according to FIG. 1;

FIG. 10 a section along the X—X line on FIG. 9;

FIG. 11 a side view of a control shaft and two switching elements of the control mechanism according to FIG. 1;

FIG. 12 a section along the XII—XII line on FIG. 11;

FIG. 13 a section along the XIII—XIII line on FIG. 11;

FIG. 14 a front view of assemblies of the switching path of the control mechanism according to FIG. 1;

FIG. 15 a perspective view of the arrangement shown on FIG. 14;

DETAILED DESCRIPTION OF PREFERRED EMBODIMENTS

Figure 26:
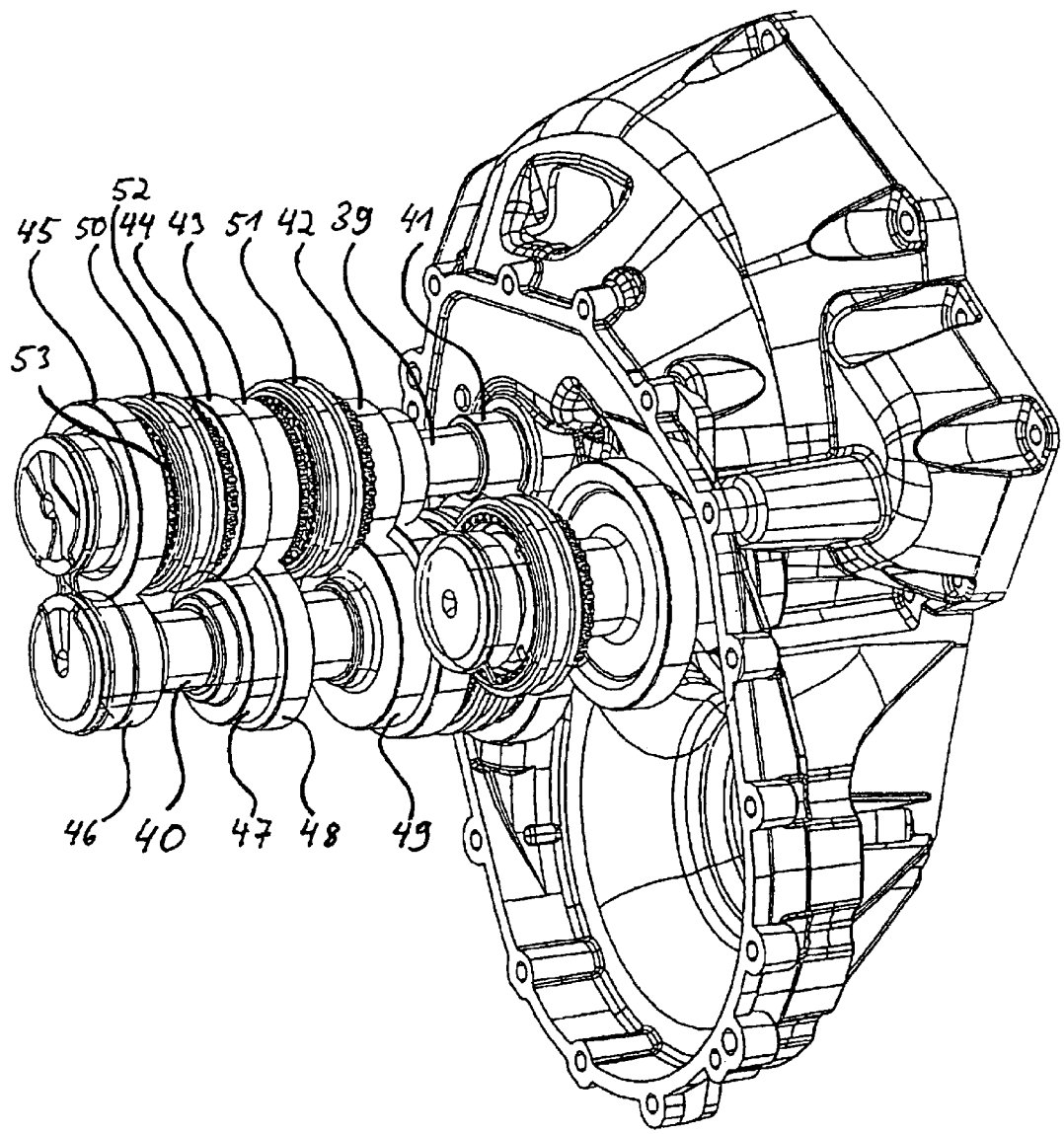
Figure 27:
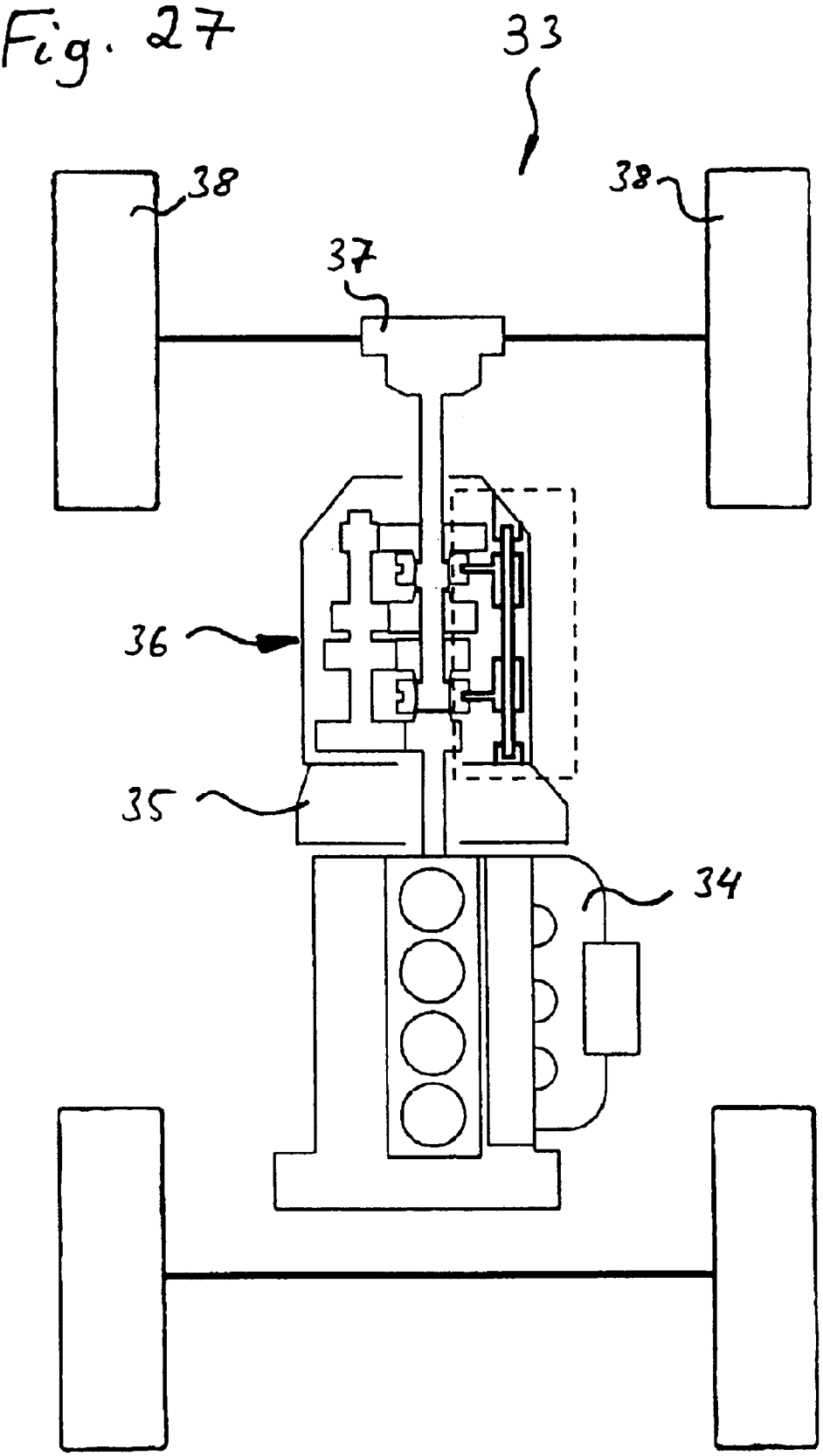
FIG. 27 a diagrammatic view of the driving path of a motor vehicle.

The control mechanism shown on the figures encompasses a switchable switching path comprised of mechanism links 2 mounted on a frame 1, as shown by example on FIG. 26 based on a gear-shift sleeve transmission. Using the transmission path, which in this embodiment is accommodated in the driving path of a motor vehicle 33 according to FIG. 27, in which a motor 34 can operate via a coupling 35 and other elements of the driving path (not shown) to drive a transmission 36 and, through the latter, driving gears 38 of a motor vehicle 33 via a differential 37, torques and rotational speeds can be influenced in a known manner by optionally incorporating at least two mechanism links 2 or toothed gears in the transmission path. This embodiment involves a total of six forward gears and one reverse gear, wherein, as shown on FIG. 26, the transmission encompasses a main shaft 39 and a preceding shaft 40, on which escape wheels 41 to 45 can optionally be secured to the main shaft 39 by axially shifting the corresponding gear-shift sleeve 50, 51. Such a shifting is initially accompanied by a synchronization before the gear-shift sleeve, which meshes with the corresponding guide sleeve as well as the corresponding switching collar 52 to 54 (numbered as an example) of the corresponding escape wheel, and hence fixes this escape wheel on the main shaft 39 and engages the corresponding gear. Moving the corresponding gear-shift sleeve 50, 51 back disengages the corresponding gear.

Figure 25:
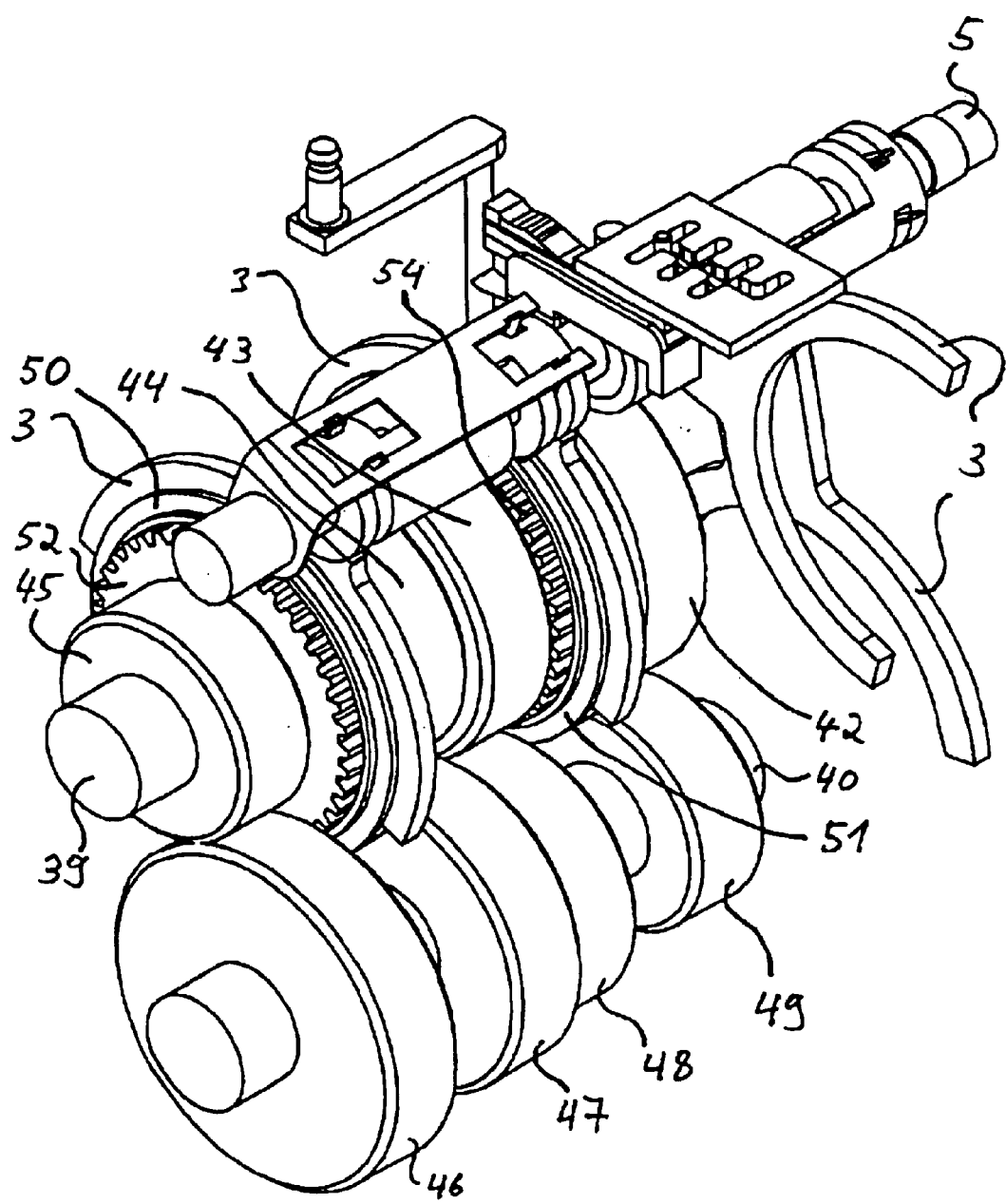
FIG. 25 the arrangement according to FIG. 1 in its built-in position relative to a main and preceding shaft of a gear-shift sleeve transmission FIG. 26 a perspective view of a mechanism links of a gear-shift sleeve transmission according to FIG. 25 mounted on a frame.

To this end, the corresponding gear-shift sleeves 50, 51 are held on switching elements 3 or wipers, and can be engaged or disengaged by means of these switching elements 3, as shown by example in particular on FIG. 25.

Figure 17:
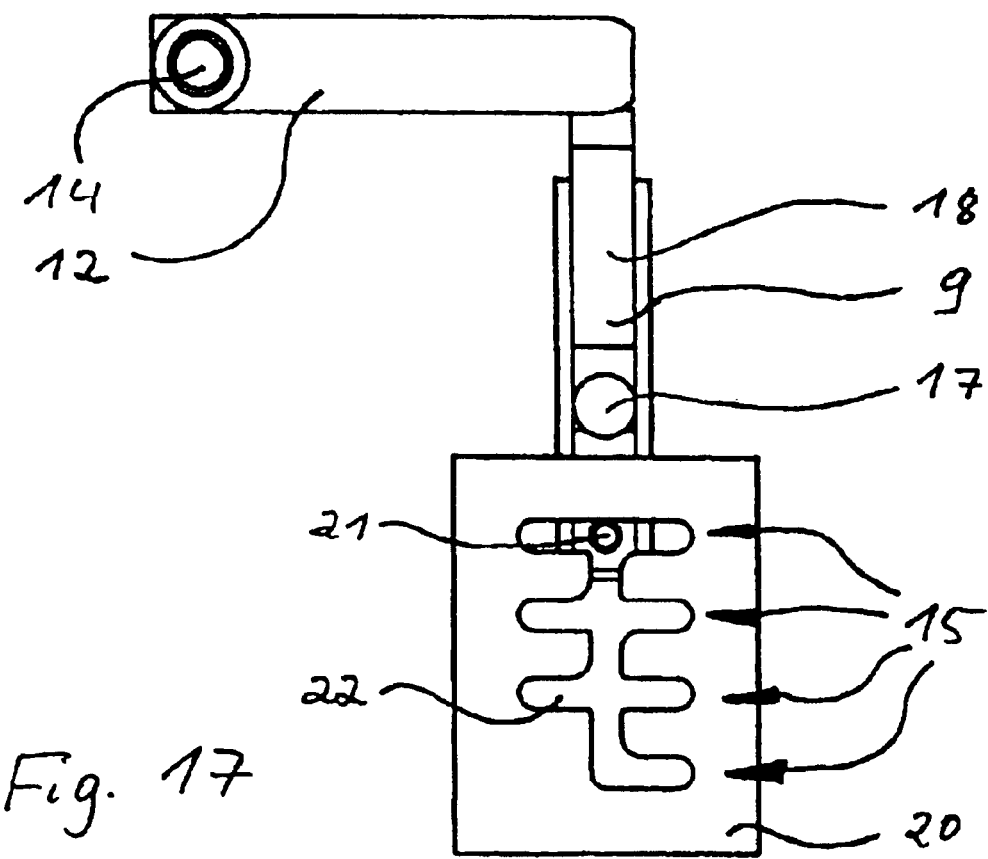
FIG. 17 a top view of the arrangement shown on FIG. 14.
Figure 18:
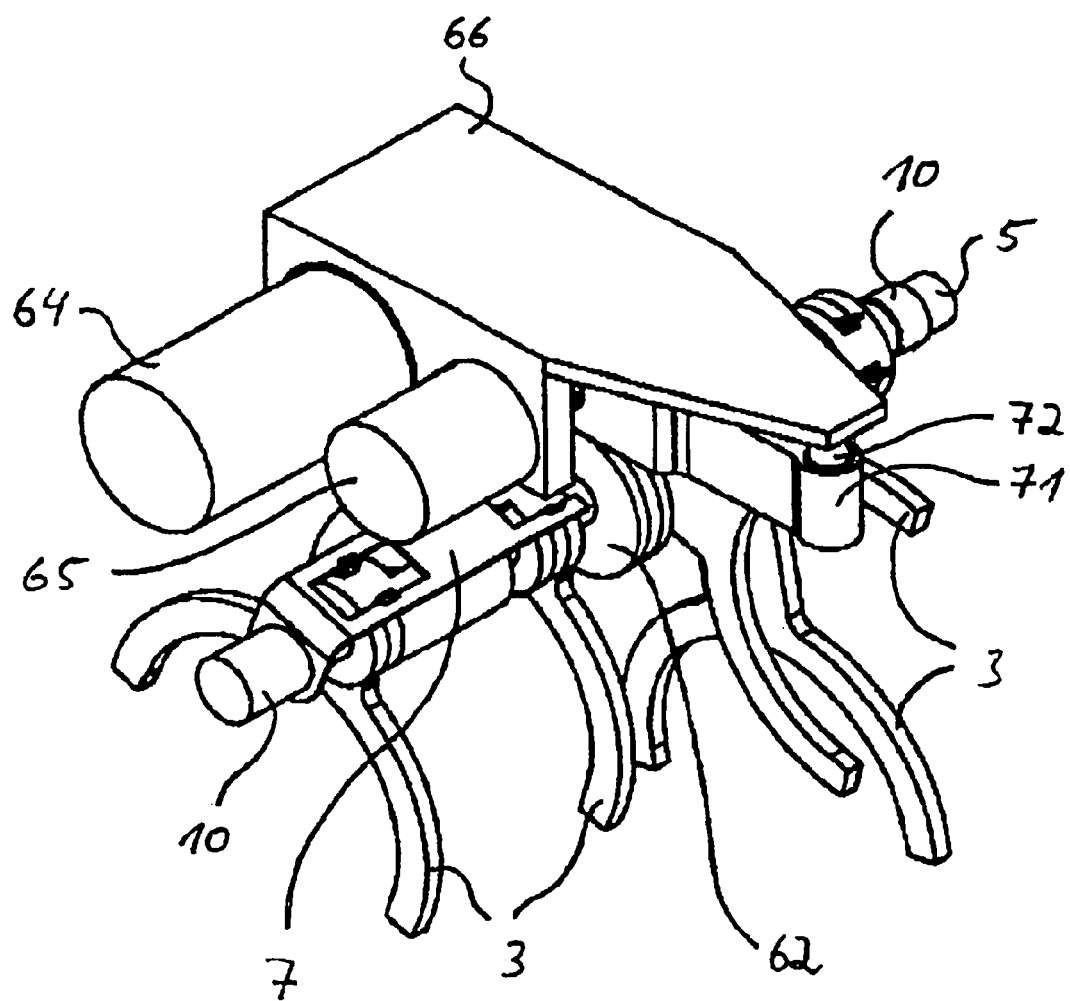
FIG. 18 a view of a second control mechanism according to the invention in a depiction similar to FIG. 1.
Figure 19:
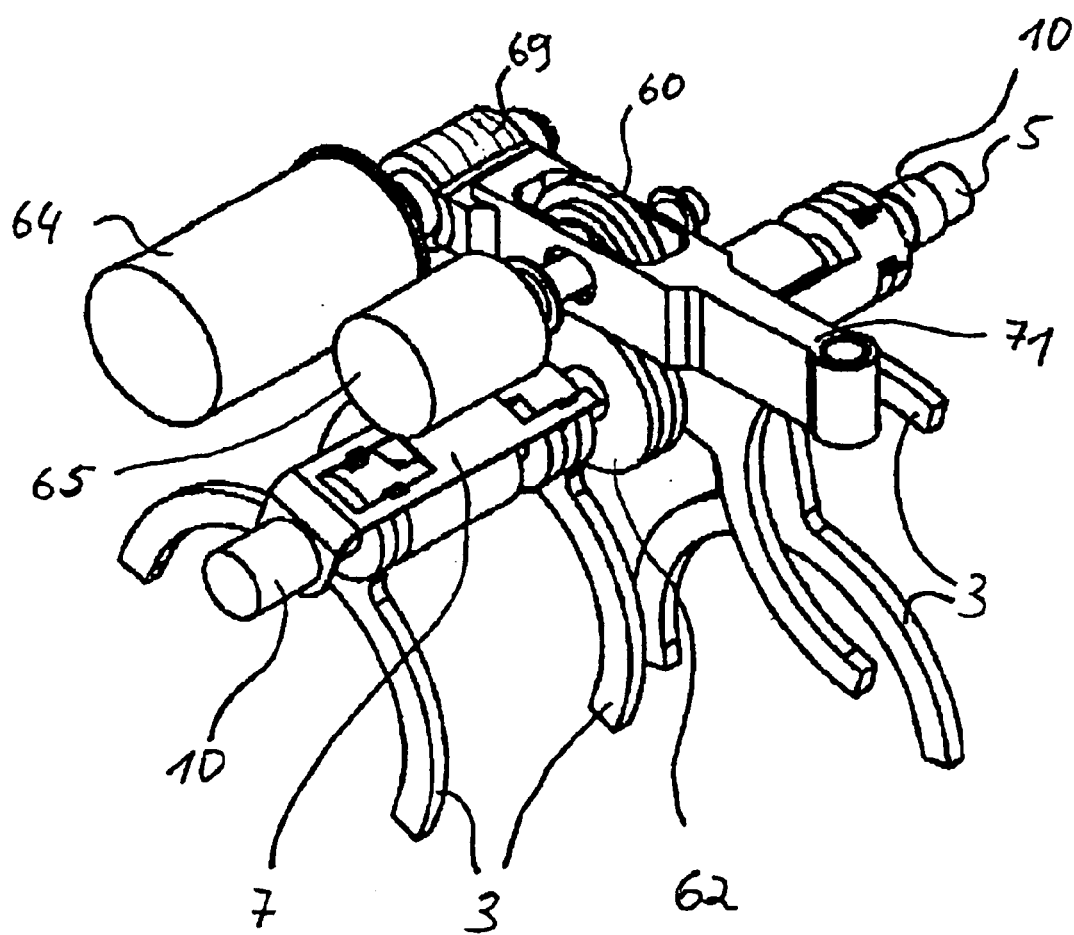
FIG. 19 the control mechanism according to FIG. 18 with casing opened.
Figure 20:
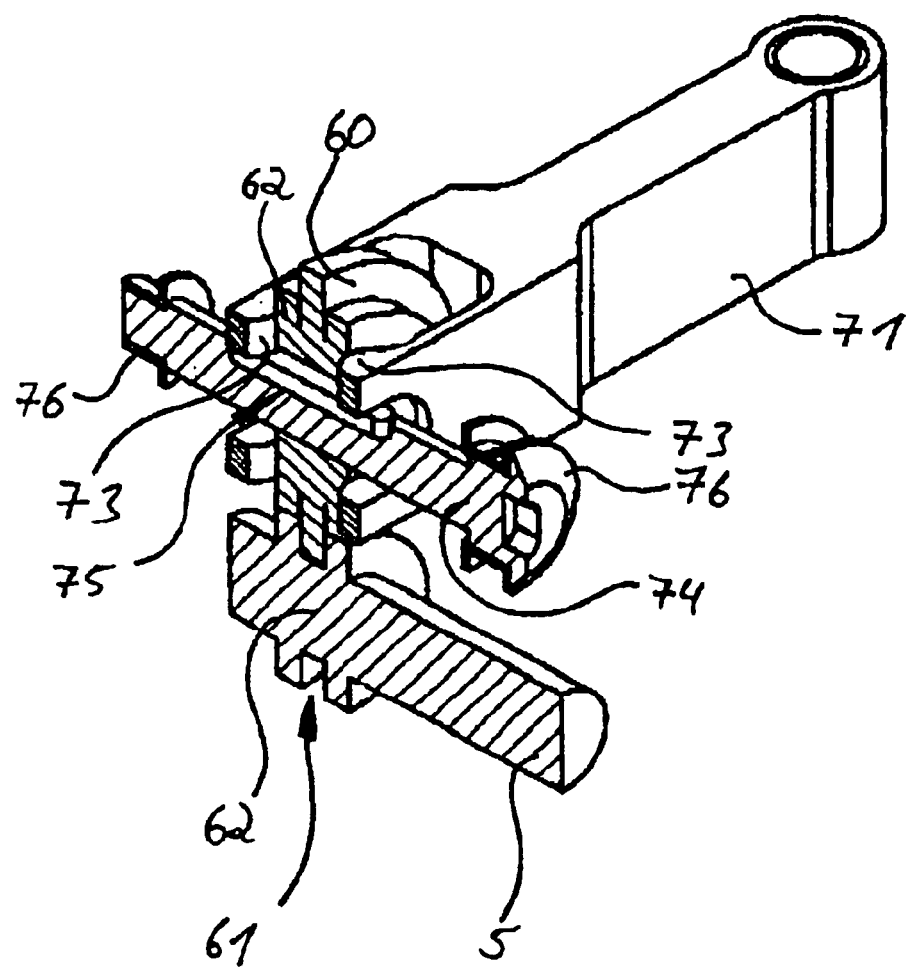
FIG. 20 a perspective sectional view of the control mechanism according to FIGS. 18 and 19, through the control shaft.
Figure 21:
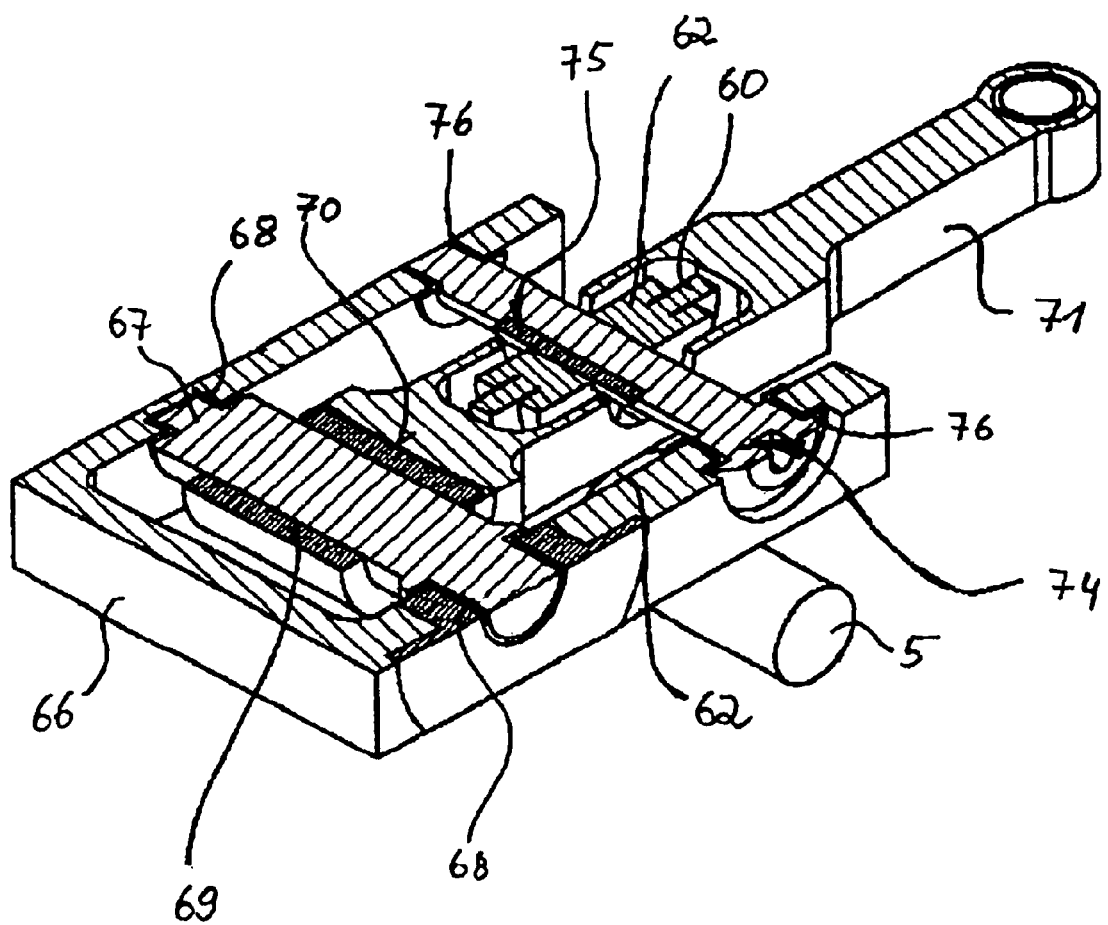
FIG. 21 a perspective sectional view of the control mechanism according to FIGS. 18 and 19, through the frame.

For engagement and disengagement, the switching elements 3 are interactively connected with a switching pinion gear, in this embodiment a shift lever, via a switching path 4. As visible in particular from FIGS. 13 and 17, this switching path 4 encompasses a lever 12 on the one hand, and a gear rack 9 on the other, which are each interactively connected with the switching pinion gear in a known manner by means of switching passes (not shown). To this end, the lever 12 is provided with a projection 14 on the one hand, to which such a switching pass can be secured, while the gear rack 9 has a recess 11 on the other hand, in which a corresponding switching pass can engage.

Actuating the gear rack 9 makes it possible to select a suitable lane 15 (see FIG. 17), while the lever 12 is used to disengage or engage the gears belonging to a corresponding lane 15. For reasons of operational safety, a template 20 on the frame 1 of the control mechanism is provided with a recess 22, in which runs a corresponding template pin 21, which is secured to the gear rack 9.

The switching path 4 also encompasses a toothed gear 8, which is situated on a control shaft 5, and engages in the gear rack 9. This results in a shifting of the gear rack 9 in a corresponding rotational movement of the control shaft 5.

In addition, the toothed gear 8 is enveloped by an axial drive 13, which on its part guides the gear rack 9. The axial drive 13 is interactively connected with the lever 12 via an arm 23, and is shifted along the axis of the control shaft 5 via the lever 12. The fact that the axial drive 13 positively envelops the toothed gear 8 relative to the control shaft 5 causes the control shaft 5 to follow an axial shifting of the axial drive 13.

The control shaft 5 is mounted by sliding bearings 10 on the frame 1 so that it can rotate and shift axially. In this embodiment, this bearing takes place with sliding bearings 10, which are accommodated in a bearing shell 11 of the frame 1, for example. It is understood that suitable roller bearings or other types of bearings can be used in this regard, especially since the control shaft 5 is shifted under a switching load, so that a sufficient quality of bearing must be selected for the switching shaft 5.

The switching elements 3 are mounted to the control shaft 5 via bearing bushes 16 (see in particular FIGS. 5 to 7 and 9 to 12), so that the switching shaft 5 serves as a bearing element relative to the switching elements 3. As readily apparent, the bearing bushes 16 have divided bearing surfaces 24 and 25 (marked by way of example on FIGS. 5 to 7). In this way, the bearing bushes 16 can be interleaved, which increases the overall length of the bearing, and counters tilting.

In this embodiment, the switching elements 3 are mounted on slide bearings to the control shaft 5 in the simplest manner, since the switching elements 3 are moved only under no load relative to the control shaft 5. Depending on requirements, it is conceivable to also provide other types of bearings, in particular more complex bearings, such as roller bearings or sliding bearings with special bearing bushes.

As already explained above, a corresponding lane selection 15 involves rotating the control shaft while axially shifting it for engaging or disengaging a gear or mechanism link 2. In this case, means are provided in this embodiment with which a switching element 3 can be selected and connected with the control shaft in such a way that the selected switching element 3 follows an axial movement of the control shaft 5. The respective selection is here made by rotating the control shaft 5.

In this embodiment, a spring element 6 is used to this end as a connecting element between the control shaft 5 and a respective switching element 3. This spring element 6 is connected with the switching element 3 by means of a riveted joint 26 so that it cannot be lost, and arranged in a groove 27 of the switching element 3. In this way, the spring element 6 and the connecting element are fixed between the bearing element 5 and the switching element 3 axially relative to the switching element 3.

The spring element 6 has two spring arms 28 and 29 (numbered by way of example on FIG. 2), which grip the control shaft 5. Based on the positions of the spring elements 6, the control shaft 5 has grooves 30 (numbered by way of example on FIGS. 2, 3 and 12), in which the spring elements 6 can engage, depending on the rotational position of the control shaft 5. To this end, the spring elements 6 are provided with a sufficient pre-stressing. If the control shaft 5 is now rotated, the spring elements 6 successively grip into a corresponding groove 30 of the control shaft 5 at selected rotational positions. It is understood that embodiments are also conceivable in which several spring elements engage into a corresponding groove in a rotational position. By engaging into the grooves 30, the spring elements 6 are each axially brought into a formfitting engagement with the control shaft 5, while the spring elements 6 can otherwise glide along the surface of the control shaft 5 (see FIGS. 2 and 3). In this regard, the spring elements 6 can be brought into a switching position by rotating the control shaft 5 in which the respective switching element 3 is fixed relative to the control shaft 5, i.e., in an axial direction. If the spring element is not located inside the corresponding groove 30, the spring element 6, along with the corresponding switching element 3, can be axially shifted relative to the control shaft 5.

Figure 1:
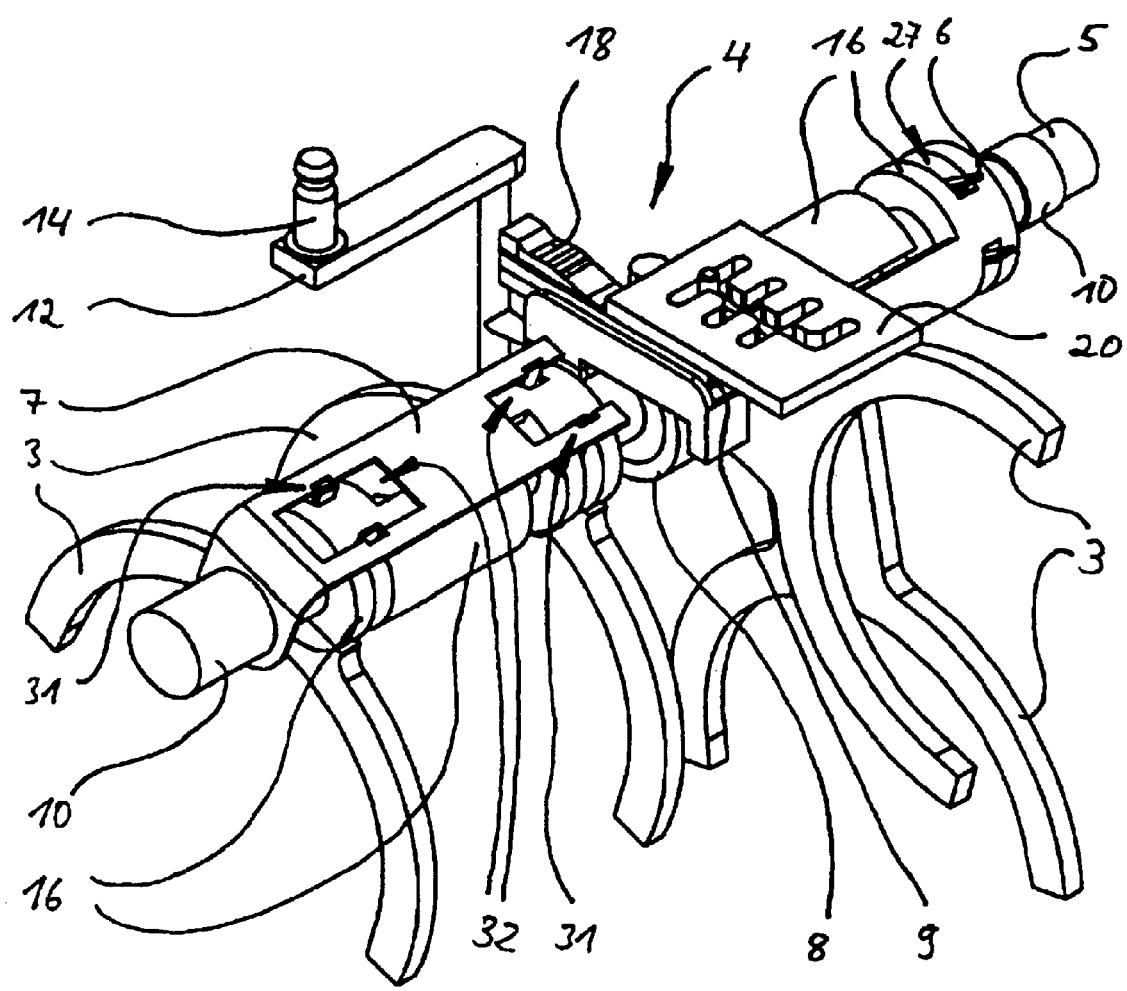
FIG. 1 a perspective view of an arrangement comprised of a control shaft, switching elements and switching path of a control mechanism according to the invention.
Figure 16:
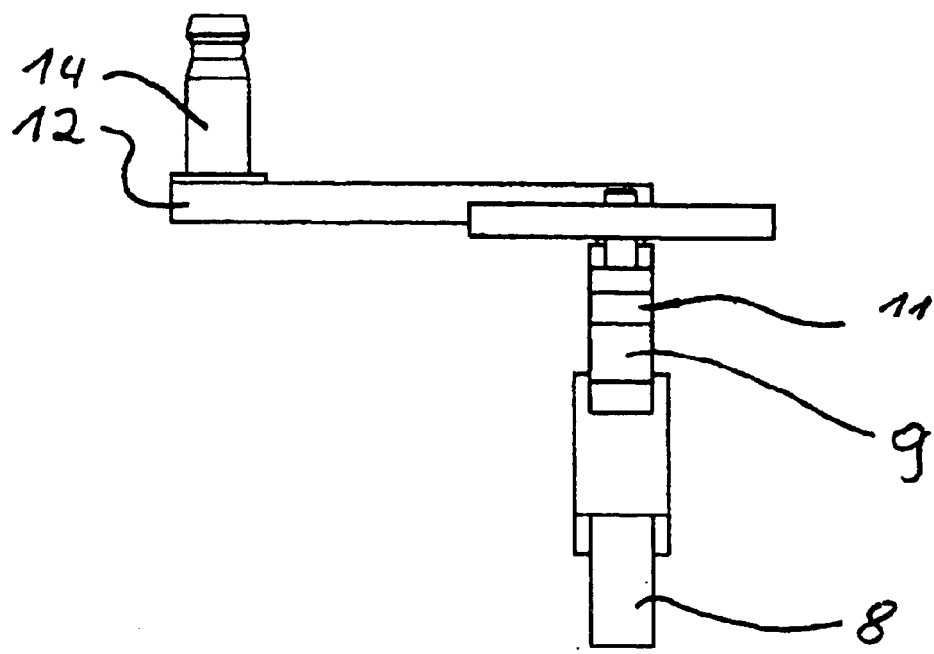
FIG. 16 a side view of the arrangement shown on FIG. 14.

A binder 7 is provided as an insertion lockout on the frame 1, fixed locally relative to the frame 1 or relative to the bearing bush 11 of the frame 1. The binder 7 has grooves 31 (numbered by example on FIG. 1), whose axial position relative to the control shaft 5 corresponds to the grooves 30 of the control shaft 5. In this case, the spring elements 6 as well as the corresponding grooves 30 and 31 are arranged relative to each other in such a way that the spring element 6 is located either in the grooves 30 or in the grooves 31, depending on the rotational position of the switching spring [sic] 5. In this way, the control shaft 5 can be rotated to move the respective spring element 6 from one switching position in which it fixes the switching element 3 relative to the control shaft 5 into a locked position in which it fixes the switching element 3 relative to the frame 1. This ensures that only the switching elements 3 corresponding to the rotational position of the switching shaft 5 are axially fixed relative to the control shaft 5.

The binders 7 also have recesses 32 that enable an axial shifting of the spring elements 6, so that these can follow an axial shift of the control shaft 5.

In order to have a suitable and user-friendly influence on the counteracting forces of the switching path against a lane selection, a gate 18 is provided on the gear rack 9, against which a gate follower 19 is pressed by means of a spring 17. The spring 17 here serves as an energy-storing device, which draws or feeds energy or work depending on the position of the gate in the switching path. For example, this makes it possible to suitably select or correct an idle position of a corresponding shift lever as well as a desired force profile on actuation of the switch lever, in particular during lane selection.

The transmissions disclosed on FIGS. 18 to 24 correspond to the embodiment described above in terms of their selector forks 3 and control shaft 5. Only the drive circuit is automated. In addition, the the formfitting engagement in the area of the toothed gear or the drive of the control shaft 5 is realized in a different manner.

In this regard, a disk 60 permanently engages a groove 61 of a toothed gear 62 that is fixed on the control shaft 5 or formed as a single piece with the latter in these embodiments. The disk 60 is also embedded in a toothed gear 63, which is mounted in such a way that it can both axially shift and rotate.

In the embodiment shown on FIGS. 18 to 21, actuators 64 and 65, which are preferably electric motors, but can also be hydraulic, pneumatic or other adjusting devices, are fixed on a frame 66. In this embodiment, the actuator 64 uses an actuator shaft 67 mounted in actuator bearings 68 to drive a thread 69, which can also be designed as a worm wheel, for example, and imparts a rotational movement to it or fixes it in a specific position. A counter-thread 70 rigidly connected with a swiveling fork 71, which can swivel around a bolt 72 of the frame 66, engages the thread 69. This transforms the swivel motion of the swiveling fork 71 around the bolt 72 into a sliding motion of the fork noses 73 on the disk 60, so that a gear can be engaged or disengaged as a result.

The lanes are changed with the actuator 65, which uses an actuator shaft 74 on which is provided an axial gearing 75, e.g., a spline gearing or a tongue-in-groove connection, to drive the toothed gear 62, which is situated so that it can axially shift on the actuator shaft 74. The actuator shaft is mounted to the frame 66 via actuator bearings 76. Because the toothed gear 62 is permanently engaged with the toothed gear 62, a lane change can be effected by rotating the control shaft 5.

Figure 22:
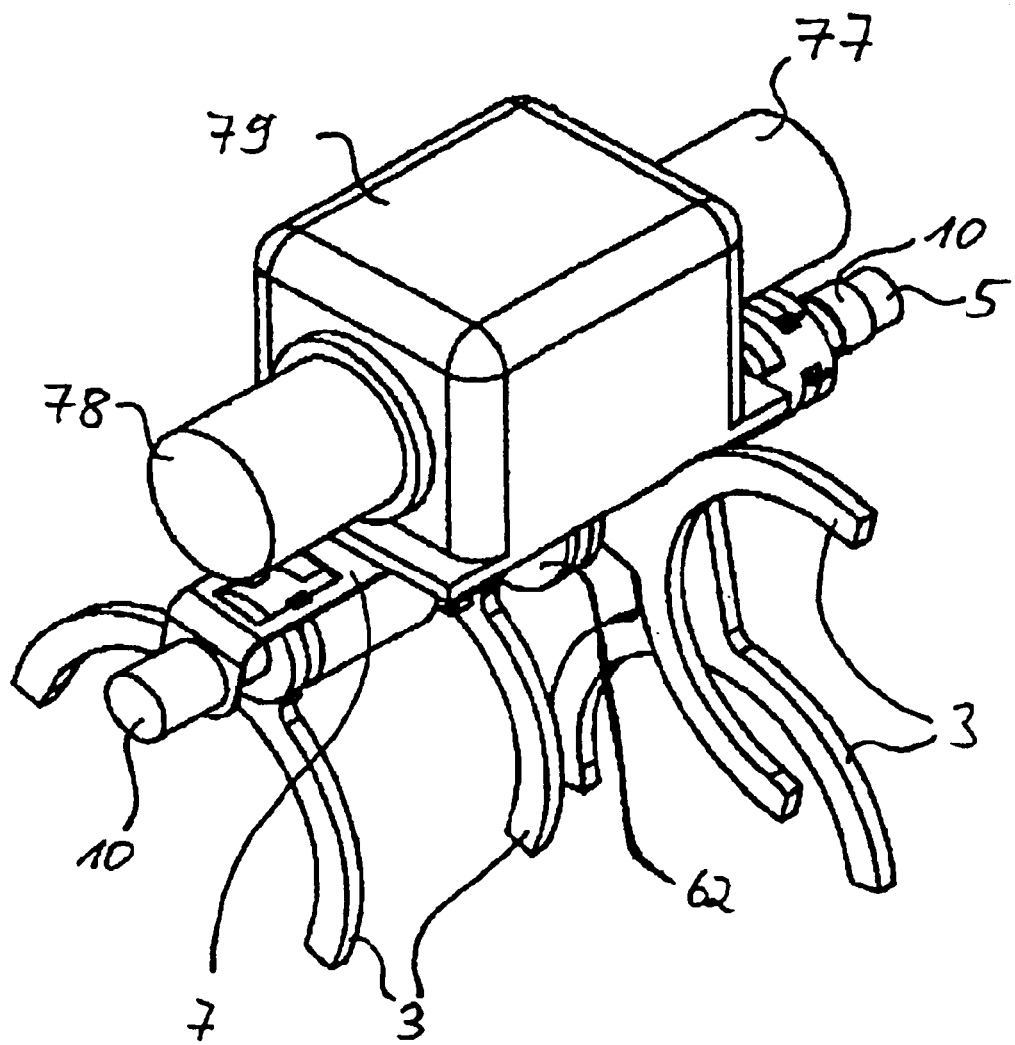
FIG. 22 a view of the third control mechanism according to the invention in a depiction similar to FIG. 1.
Figure 23:
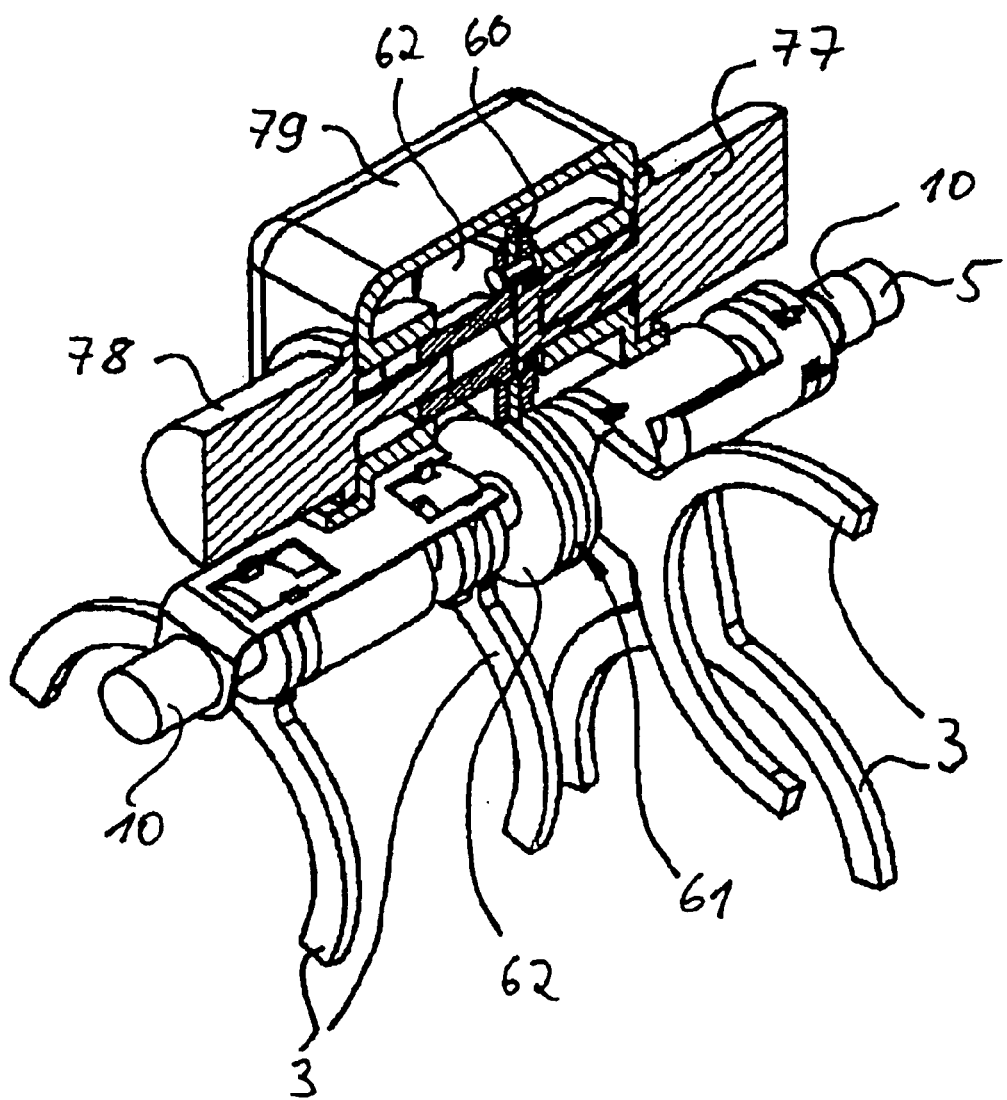
FIG. 23 a perspective, partially split depiction of the arrangement according to FIG. 22.
Figure 24:
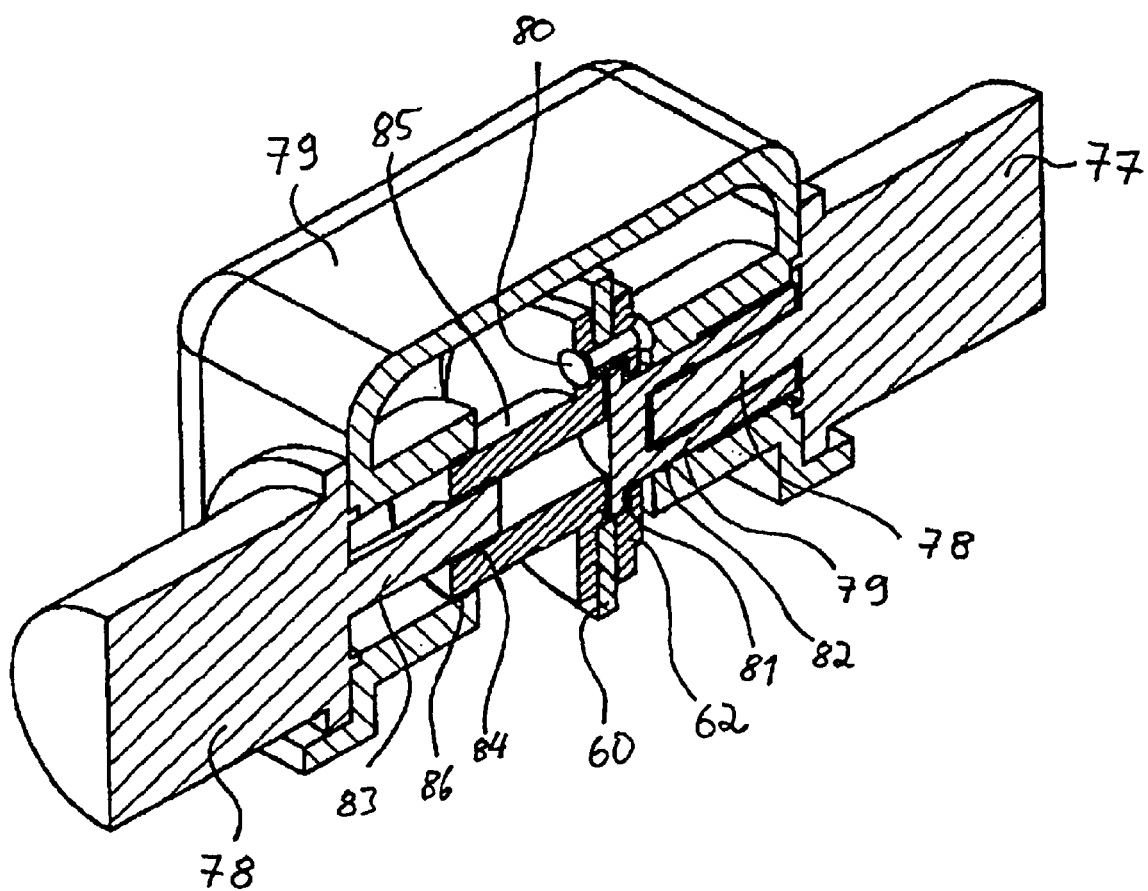
FIG. 24 a magnified section of the depiction on FIG. 23.

In the embodiment shown on FIGS. 22 to 24, actuators 77 and 78 are arranged essentially coaxially on a frame or casing 69. The actuator 77 slides a flange 79 axially back and forth over its actuator axis 78, which has a thread, or fixes it in a desired position. In this embodiment, the disk 60 is bonded via rivets 80 or similar fastening means with the toothed gear 62, which also grips the flange 79 and fixed it axially. In this case, the flange 79 is mounted by a bearing 81 to a toothed gear 62 or the disk 60 so that it can rotate, and by a bearing 82 to a frame 79 so that it can axially shift. To execute a gear change, the disk 60 permanently engages the groove 61 in this embodiment as well.

To change lanes, the actuator 78 is in a position to rotate the toothed gear 62, which is permanently geared with the toothed gear 62. In this case, an actuator axis 83 is mounted over an axially active gearing 84, like a spline gearing, to a flange 85 so that it can shift axially, wherein the flange is designed as a single piece with the toothed gear 62 in this embodiment. The flange 85 is mounted on a bearing 86 both axially and so that it can rotate on the frame 79. The bearings 81 and 82 can be designed as sliding or roller bearings. The same holds true for the bearings 84 and 86, which can be designed as sliding bearings or bearings with rollers or similar sliding aids.

What is claimed is:

1. A control mechanism with a switchable transmission path comprising mechanism links mounted on a frame, and a switching pinion gear, for incorporating at least two mechanism links in a transmission path for switching purposes, wherein, the two mechanism links are moveably held on a mount of the frame via switching elements and wherein the switching pinion gear acts through a switching path to engage or disengage one of the two mechanism links on the switching elements, and wherein the mount encompasses a bearing element as part of the switching path and movable relative to the frame; wherein at least one connecting element disposed between the bearing element and one of the switching elements can be shifted to at least two positions, wherein in a first switching position the connecting element fixes the switching element relative to the bearing element and releases it relative to the frame, and wherein in a second locked position the connecting element releases the switching element relative to the bearing element and fixes the switching element relative to the frame; wherein the at least one connecting element can be shifted as part of the switching path by the bearing element between the first switching position and the second locked position, and wherein the at least one connecting element is a spring element, which can be shifted by the bearing element into the first switching position and the second locked position.

2. The control mechanism according to claim 1, wherein the at least one switching element and the bearing element are moved together when a switching process is initiated with the switching element.

3. The control mechanism according to claim 1, wherein the connecting element is secured to the switching element.

4. The control mechanism according to claim 1, wherein the connecting element fixes the switching element relative to a stationary built-in lockout in the second locked position.

5. The control mechanism according to claim 1, wherein the bearing element is a control shaft.

6. The control mechanism according to claim 5, wherein the control shaft is mounted by a sliding bearing to one of the frame or to a bearing bush of the frame.

7. The control mechanism according to claim 5 wherein the control shaft for actuating a switching element, is axially connected with the respective switching element in formfitting engagement.

8. The control mechanism according to claim 5, wherein the control shaft can be axially shifted via the switching pinion gear.

9. The control mechanism according to claim 8, wherein the switching path encompasses a lever that formfittingly engages in an axial drive for the control shaft.

10. The control mechanism according to claim 9, wherein the switching path includes a gear rack for engagement by the lever and which grips a toothed gear of the control shaft to form the axial formfitting engagement relative to the control shaft.

11. The control mechanism according to claim 9, wherein the lever is drive-connected with the switching pinion gear by means of a projection.

12. The control mechanism according to claim 5, wherein the control shaft is connected to the switching pinion gear by a rotary actuator.

13. The control mechanism according to claim 12, wherein the control shaft encompasses a driving gear which is driven by the switching pinion gear.

14. The control mechanism according to claim 13, wherein the driving gear is s toothed gear.

15. The control mechanism according to claim 12 wherein the switching path encompasses a gear rack which is interactively connected with a toothed gear.

16. The control mechanism according to claim 15, wherein the gear rack is interactively connected with the switching pinion gear by means of a switching pass, engages a recess of the gear rack.

17. The control mechanism according to claim 16, wherein the bearing block is a bearing bush.

18. The control mechanism according to claim 12, wherein the control shaft is connected to the switching pinion gear by a rotary actuator for lane selection.

19. The control mechanism according to claim 1, wherein the switching path is interactively connected with a variation device for varying the reaction forces in the switching pinion gear.

20. The control mechanism according to claim 19, wherein the variation device encompasses an energy-storing device activated as a function of a position of the switching pinion gear.

21. The control mechanism according to claim 20, wherein the energy-storing device encompasses a resilient spring element.

22. The control mechanism according to claim 19, wherein the variation device encompasses a gate and a gate follower.

23. The control mechanism according to claim 22, wherein the gate is provided on a gear rack of the switching path, and the gate follower is provided on the frame.

24. The control mechanism according to claim 22, wherein the gate follower is provided on a gear rack of the switching path, and the gate is provided on the frame.

25. The control mechanism according to claim 1, wherein at least one switching element is secured to one of the mount or the bearing element via a sliding bearing.

26. The control mechanism according to claim 1, wherein at least two switching elements are mounted on the bearing element.

27. A control mechanism with a switchable transmission path comprising: mechanism links mounted on a frame, and a switching pinion gear, through which at least two mechanism links can be incorporated in a transmission path for switching purposes, wherein, the mechanism links are held in an axially movable disposition on a mount of the frame via switching elements, and wherein the switching pinion gear acts through a switching path to one of engage or disengage one of the two mechanism links on the switching elements, wherein the switching elements are secured to the mount by an axially divided bearing block.

28. A control mechanism with a switchable transmission path comprising: mechanism links mounted on a frame, and a switching pinion gear, through which at least two mechanism links can be incorporated in a transmission path for switching purposes, wherein, the mechanism links are held in an axially movable disposition on a mount of the frame via switching elements, and wherein the switching pinion gear acts through a switching path to one of engage or disengage one of the two mechanism links on the switching elements, wherein the switching elements are secured to the mount by an axially divided bearing, wherein the bearing block is interleaved by at least two switching elements.

29. A control mechanism with a switchable transmission path comprising mechanism links mounted on a frame, and a switching pinion gear, for incorporating at least two mechanism links in a transmission path for switching purposes, wherein, the two mechanism links are moveably held on a mount of the frame via switching elements, and wherein the switching pinion gear acts through a switching path to engage or disengage one of the two mechanism links on the switching elements, and wherein an insertion lockout is configured to engage a spring element which is mounted on one of the switching elements for fixing an non-engaged switching element relative to the frame; wherein the insertion lockout is securely attached to the frame, wherein the switching path is interactively connected with a variation device for varying the reaction forces in the switching pinion gear; wherein the variation device encompasses an energy-storing device activated as a function of a position of the switching pinion gear; wherein the energy-storing device encompasses a resilient spring element, wherein the variation device encompasses a gate and a gate follower, wherein the gate is provided on a gear rack of the switching path, and the gate follower is provided on the frame.

30. The control mechanism according to claim 29, wherein the insertion lockout is a binder secured to the frame.

31. The control mechanism according to claim 29, wherein the gate follower is provided on the gear rack of the switching path, and the gate is provided on the frame.

32. The control mechanism according to claim 29, wherein the mount encompasses a bearing element and wherein at least one switching element is secured to one of the mount or the bearing element via a sliding bearing.

33. The control mechanism according to claim 29, wherein at least two switching elements are mounted on the bearing element.

34. The control mechanism with a switchable transmission path comprising: mechanism links mounted on a frame, and a switching pinion gear, through which at least two mechanism links can be incorporated in a transmission path for switching purposes, wherein, the mechanism links are held in an axially movable disposition on a mount of the frame via switching elements, and wherein the switching pinion gear acts through a switching path to engage or disengage one of the two mechanism links on the switching elements, wherein the switching elements are secured to the mount by an axially divided bearing block, so that at least one of the switching elements is secured to one of the mount or bearing element via a sliding bearing.

35. A control mechanism with a switchable transmission path comprising: mechanism links mounted on a frame, and a switching pinion gear, through which at least two mechanism links can be incorporated in a transmission path for switching purposes, wherein, the mechanism links are held in an axially movable disposition on a mount of the frame via switching elements, and wherein the switching pinion gear acts through a switching path to one of engage or disengage one of the two mechanism links on the switching elements, the switching elements are secured to the mount by an axially divided bearing block, so that at least two of the switching elements are mounted on a bearing element.

36. The control mechanism according to claim 35, wherein the bearing block is a bearing bush.

* * * * *

UNITED STATES PATENT AND TRADEMARK OFFICE
CERTIFICATE OF CORRECTION

PATENT NO.     : 6,845,685 B2                                              Page 1 of 1
DATED          : January 25, 2005
INVENTOR(S)    : Werner Brandwitte, Tim Bartling and Georg Quartier It is certified that error appears in the above-identified patent and that said Letters Patent is hereby corrected as shown below:

<u>Title page,</u>
Item [75], Inventor, change third inventor's last name to -- Quartier --.

Signed and Sealed this

Twenty-seventh Day of September, 2005

JON W. DUDAS
*Director of the United States Patent and Trademark Office*